United States Patent [19]

Wright et al.

[11] Patent Number: 4,535,343

[45] Date of Patent: Aug. 13, 1985

[54] THERMAL INK JET PRINTHEAD WITH SELF-PASSIVATING ELEMENTS

[75] Inventors: Conrad L. Wright; James G. Bearrs; C. S. Chan; Robert R. Hay, all of Boise, Id.; Frank Ura, Woodside, Calif.

[73] Assignee: Hewlett-Packard Company, Palo Alto, Calif.

[21] Appl. No.: 547,700

[22] Filed: Oct. 31, 1983

[51] Int. Cl.[3] .............................................. G01D 15/18

[52] U.S. Cl. .............................................. 346/140 R

[58] Field of Search .............................................. 346/140 R

[56] References Cited

U.S. PATENT DOCUMENTS 4,335,389 6/1982 Shirato .............................. 346/140

4,336,548 6/1982 Matsumoto .............................. 346/140

4,438,191 3/1984 Cloutier .............................. 346/140 X

*Primary Examiner*—Joseph W. Hartary

*Attorney, Agent, or Firm*—William H. MacAllister

[57] ABSTRACT

A passivation layer in a thermal ink jet printhead is formed or "grown" by a reaction between the materials of the ink jet structure to be protected and an element which will form a chemically inert, electrically insulating, thermally conductive compound. The resistor structure may be of tantalum or tantalum nitride and the electrical conductors therefor may be of aluminum. By subjecting this resistor-conductor structure to a reactive oxide atmosphere, the exposed surfaces of both are anodized so that a surface film of aluminum oxide is formed on the aluminum conductor and a surface film of tantalum pentoxide or tantalum oxynitride is formed on the resistor structure.

11 Claims, 1 Drawing Figure

THERMAL INK JET PRINTHEAD WITH SELF-PASSIVATING ELEMENTS

BACKGROUND OF THE INVENTION

The rapidity of modern-day data processing imposes severe demands on the ability to produce a printout record at very high speed. Printing systems in which permanently shaped character elements physically contact a recording medium are proving to be too slow and too bulky for many applications. Thus, the industry has turned to other alternatives involving non-impact printing schemes using various techniques to cause a desired character to be formed on the recording medium. Some of these involve the use of electrostatic or magnetic fields to control the deposition of a visible character-forming substance, either solid (i.e., dry powder) or liquid (i.e., ink) on the medium which is usually paper. Other systems utilize electrophotographic or ionic systems in which an electron or ion beam impinges on the medium and causes a change in coloration at the point of impingement. Still another system employs a thermal image to achieve the desired shape coloration change. Of more recent import is a printing technique, called ink jet printing, in which tiny droplets of ink are electronically caused to impinge on a recording medium to form any selected character at any location at very high speed. Ink jet printing is a non-contact system which, in some implementations, requires no specially treated recording media, ordinary plain paper being suitable, and which requires no vacuum equipment or bulky mechanical mechanisms. The present invention relates to this kind of printing system.

The ink jet system to which the invention relates is called an impulse, or ink-on-demand printer, being one in which ink droplets are impelled on demand from a nozzle by thermal energy. The invention is concerned with a nozzle head for this latter type of system.

In a co-pending application, Ser. No. 415,290 filed Sept. 7, 1982 now U.S. Pat. No. 4,490,728 and entitled THERMAL INK JET PRINTER by John L. Vaught et al., and assigned to the instant assignee, an ink-on-demand printing system is described which utilizes an ink-containing capillary having an orifice from which ink is ejected. Located closely adjacent to this orifice is an ink-heating element which may be a resistor located either within or adjacent to the capillary. Upon the application of a suitable current to the resistor, it is rapidly heated. A significant amount of thermal energy is transferred to the ink resulting in vaporization of a small portion of the ink adjacent the orifice and producing a bubble in the capillary. The formation of this bubble in turn creates a pressure wave which propels a single ink droplet from the orifice onto a nearby writing surface or recording medium. By properly selecting the location of the ink-heating element with respect to the orifice and with careful control of the energy transfer from the heating element to the ink, the ink bubble will quickly collapse on or near the ink-heating element before any vapor escapes from the orifice.

It will be appreciated that the lifetime of such thermal ink jet printers is dependent, among other things, upon conductor and resistor lifetime. It has been found that a significant factor in conductor and resistor failure is cavitation damage which occurs during bubble collapse as well as by chemical attack by the ink itself. Hence, it is desirable that resistor wear due to chemical attack and cavitation damage should be minimized as much as possible. In co-pending application Ser. No. 449,820 entitled THERMAL INK JET PRINTER UTILIZING SECONDARY INK VAPORIZTION, filed on Dec. 15, 1982 by John D. Meyer and assigned to the instant assignee, a solution to reducing resistor wear is described. The resistive layer is covered with a passivation layer to provide chemical and mechanical protection during operation. The passivation layer in this application may be a thin layer of such materials as silicon carbide, silicon oxide, or aluminum oxide. In co-pending application Ser. No. 443,972 entitled MONOLITHIC INK JET ORIFICE PLANT/RESISTOR COMBINATION filed Nov. 23, 1982 by Frank L. Cloutier, et al., and assigned to the instant assignee, it is suggested that the passivating or protective layer may be formed initially on the orifice plate of such materials as silicon oxynitride, aluminum oxide or titanium dioxide as well as silicon dioxide. Resistors and conductors are then deposited on this passivation layer. In co-pending application, Ser. No. 444,412 entitled INVERSE PROCESSED RESISTANCE HEATER, filed Nov. 24, 1983, by William J. Lloyd and assigned to the instant assignee, a similar passivation layer of silicon dioxide or silicon carbide is deposited over already-formed resistors and conductors of tantalum/aluminum alloy and aluminum, respectively.

In co-pending application of Friedrich Scheu, Ser. No. 497,774 entitled THERMAL INK JET PRINTHEAD filed May 25, 1983 and assigned to the instant assignee, a passivation structure comprising two distinct layers is disclosed. The upper layer, the one in contact with the ink and on which the ink bubble collapses, is silicon carbide. The underlying layer which covers the resistor structure (phosphorus-diffused silicon) is silicon nitride or oxynitride. The nitride is employed because of its excellent adherence to the materials constituting the resistor structure and the electrical conductors therefor.

While the foregoing passivation materials and techniques have been satisfactory as far as their wear properties are concerned, they are not as free from defects such as pinholes and the like as may be desired. Furthermore, the various structures and layers of the prior art are formed by decomposition-deposition processes, such as plasma enhanced chemical vapor deposition which are expensive to operate. Freedom from defects and pinholes is particularly critical in the case of the layer in contact with the fluid ink to which heat is being transferred from the underlying resistor structure. Irregularities in the surface of this layer, such as may be in the form of partial voids, depressions, or pinholes, may compromise the protection of the underlying layers and/or may result in a non-uniform transfer of heat to the fluid ink volume making it difficult to obtain uniformly-sized bubbles being emitted from the ink jet head at uniform velocities and trajectories.

SUMMARY OF THE INVENTION

The present invention provides a passivation layer which is not formed by any deposition process but is "grown" or formed by a reaction between the material or materials constituting the resistor structure and an element which will form a chemically-inert, electrically insulating, thermally conductive compound. By growing such a passivation layer the resistor structure is provided with a sturdy wear surface which is smooth and continuous and without defects. The resistor structure may be formed of tantalum or tantalum nitride, for example, and the electrical conductors therefor may be of aluminum, for example. With the resistor structure exposed between the electrical conductors, the printhead assemblage at this point is subjected to a reactive oxygen atmosphere. This results in the oxidation of the exposed surface portions of the aluminum conductors to anodize the same or form a surface film of $Al_2O_3$ thereon. At the same time the oxygen reacts with the exposed resistor structure to form a smooth defect-free passivation film of tantalum pentoxide ($Ta_2O_5$) or tantalum oxynitride ($Ta_2O_xN_y$). Both of these tantalum compounds are excellent thermal conductors and readily conduct heat from the underlying resistor structure to the fluid ink volume. In addition, the thickness of these passivation films can be very accurately controlled and the films exhibit excellent resistance to chemical attack. They may also be made extremely thin and, in contrast with prior passivation films, still be substantially defect-free. Being able to make the passivation films very thin is an exceptionally desirable objective since the speed at which the ink jet printhead can be operated is markedly greater with thinner films. For example, with the passivation films of the invention a printhead may be operated at a speed of 10 KHz in contrast with prior art heads using other passivation materials such as silicon carbide where the operating speed is only 2 KHz.

BRIEF DESCRIPTION OF THE DRAWINGS

The sole FIGURE is a cross-sectional view of a portion of an ink jet printhead showing one orifice and the underlying structure associated therewith embodying the present invention.

DETAILED DESCRIPTION OF THE INVENTION

Figure 1:
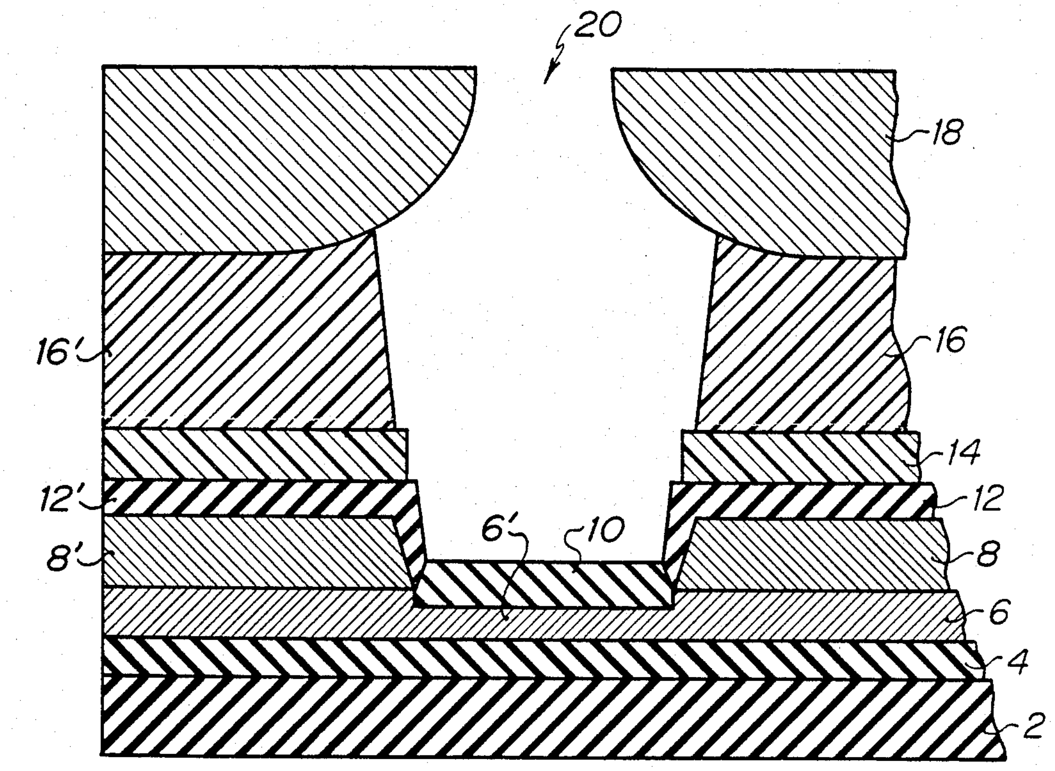

Referring now to the drawing there is shown a portion of the printhead embodying a single orifice and the structure associated therewith. The principal support structure is a substrate 2 of silicon on the upper surface of which is formed a thermally insulating layer 4 of silicon dioxide which may typically be 3.5 microns in thickness. The substrate 2 may be mono- or polycrystalline or amorphous. The term "heat insulating" is used advisedly herein since what is desired is a film which momentarily at the time the resistor is "fired" effictively blocks or retards the transfer of heat to the substrate and insures substantial transmittal thereof to the adjacent ink and then permits relatively rapid dissipation of the heat to the substrate at the end of the "firing" period. Formed on the upper surface of the silicon dioxide layer 4 is a resistive layer 6, 6'. The formation of the resistive layer 6, 6' will be described in greater detail hereinafter. While the resistive layer 6, 6' is a continuous layer preferably of tantalum or tantalum nitride, only that portion (6') not covered by electrical conductors (8, 8') functions as a heat generator when electrical current is passed therethrough. While tantalum or tantalum nitride are the presently preferred materials for the resistive layer other suitable resistor materials capable of being anodized may be employed. Representative of these are: niobium, vanadium, hafnium, titanium, zirconium, and yttrium. The electrical conductors 8, 8' are preferably of aluminum and make contact to spaced apart portions of the resistive layer 6, 6'. Other suitable low resistance materials which can be anodized may also be used. Next disposed over the resistive layer 6, 6' and its associated conductors 8 and 8' is a passivation structure comprising a layer 10 of anoxide or oxynitride of the resistive material in immediate contact with the resistive element 6' and a layer 12, 12' of an oxide of aluminum over the conductors 8, 8'. As used herein and in the appended claims the phrase "oxide" includes both the oxide per se such as ($Ta_2O_5$) and oxygen-containing compounds such as oxynitrides.

On the upper surface of the aluminum oxide layer 12, 12' is an adhesive layer 14 for bonding a barrier structure 16, 16' to the underlying layer 12, 12'. The barrier elements 16, 16' may comprise an organic plastic material such as RISTON or VACREL and may take various configurations. As shown in the drawings they are formed on each side of the underlying resistor element 6'. The barriers 16, 16' serve to control refilling and collapse of the bubble as well as minimizing cross-talk between adjacent resistors. The particular materials RISTON and VACREL are organic polymers manufactured and sold by E. I. DuPont de Nemours and Company of Wilmington, Delaware. These materials have been found to possess good adhesive qualities for holding the orifice plate 18 in position on the upper surface of the printhead assembly. In addition, both materials can withstand temperatures as high as 300 degrees centigrade. The orifice plate 18 may be formed of nickel. As shown, the orifice 20 itself is disposed immediatley above and in line with its associated resistive element 6'. While only a single orifice has been shown, it will be understood that a complete printhead system may comprise an array of orifices each having a respective underlying resistive element and conductors to permit the selective ejection of a droplet of ink from any particular orifice. It will be appreciated that the barriers 16, 16' serve to space the orifice plate 18 above the passivation layer structure 12, 12' permitting ink to flow in this space and between the barriers so as to be available in each orifice and over and above each resistive element.

Upon energization of the resistive element 6', the thermal energy developed thereby is transmitted through the passivation layer 10 to heat and vaporize a portion of the ink disposed in the orifice 20 and immediately above the resistive element 6'. The vaporization of the ink eventually results in the explusion of a droplet of ink which impinges upon an immediately adjacent recording medium (not shown). The bubble of ink formed during the heating and vaporization thereof then collapses back onto the area immediately above the resistive element 6'. The resistor 6' is, however, protected from any deleterious effects due to collapse of the ink bubble by means of the passivation layer 10. In addition, the conductor elements 8, 8' are similarly protected from contact with the ink, or ink bubble by reason of the oxide layer 12, 12' integral with and covering the conductors 8, 8'.

In fabricating the printhead structure according to the invention, it will be appreciated that the particular geometry of any particular element or layer may be achieved by techniques well known in the art of thin film formation. These techiques involve the utilization of photoresists and etching procedures to expose desired areas of the layer or structure where an element is to be formed or shaped followed by the deposition or removal by etching of material. The particular processes for forming the various layers and elements of the printhead assembly, according to the invention, will be described in the order in which these fabrication processes are followed in the construction of the device.

The thermal insulating barrier 4 of silicon dioxide may be formed by either of two techniques. The layer may be a deposited film of silicon dioxide or it may be a grown layer. The grown form of silicon dioxide is accomplished by heating the silicon substrate itself in an oxidizing atmosphere according to techniques well known in the art of semi-conductor silicon processing. A deposited form of silicon dioxide is accomplished by heating the silicon substrate 2 in a mixture of silane, oxygen, and argon at a temperature of at least 300 degrees C. until the desired thickness of silicon dioxide has been deposited. The silicon dioxide film may also be deposited by other processes termed "physical vapor deposition" of which the technique of sputtering is a well-known example.

The resistive layer 6, 6' may be formed by an RF or DC diode sputtering process using a tantalum target in an argon atmosphere at a pressure of about 2 millitorr, for example. By this process a layer of tantalum about 2000 Angstroms thick may be formed in few minutes (i.e., 2–3) using about one kilowatt of power. Alternatively, the reisistive layer 6, 6' may be formed of tantalum nitride using substantially the same process except that nitrogen is included in the atmosphere with argon. Typically the atmosphere may comprise a mixture of argon and nitrogen in which the ratio of argon to nitrogen may be about 10:1 by volume.

The conductive elements 8, 8' of aluminum may be formed by the RF or DC diode sputtering process using an aluminum target in an argon atmosphere at a pressure of about 2 millitorr, for example. A layer about 5000 Angstroms thick is laid down over the entire resistive layer 6, 6' in a few minutes (i.e., 2–3) using about two kilowatts of power. Thereafter, using standard masking and etching procedures, portions of the aluminum layer are removed from above those areas of the resistive layer where it is desired to form one or more resistive elements (6'). For example, a photoresist mask is formed over the deposited aluminum layer 8, 8' and developed to subsequently form an opening in the photoresist immediately above the area 6' of the resistive layer. The aluminum is thus exposed in this opening in the photoresist and may be selectively removed by a standard aluminum etchant comprising a mixture of phosphoric, acidic, and nitric acids. Thereafter, the photoresist mask is removed leaving the aluminum conductive elements 8, 8' in situ as shown and the resistive element 6' exposed.

The self-passivation layers 10, 12 and 12' are then anodized by any one of a variety of electrolytes such as water-soluble polyprotic acid (i.e., citric or tartaric acids) with a glycol water base (i.e., ethylene glycol) using a constant current mode with current densities ranging from 0.01 to 1.0 $ma/cm^2$. As is well known in the anodizing art, the electrolytes and voltage limits may be varied to produce oxide films of the desired thickness and with the desired heat transfer and corrosion properties. The anodizing process is well known and is described in greater detail in a text entitled "Tantalum Thin Films" by Westwood, Waterhouse and Wilcox, published by Academic Press, New York, New York. The processes described therein are equally applicable to the anodization of aluminum. In the preferred embodiment the aluminum and the tantalum and/or tantalum nitride films are anodized simultaneously by the same process.

The anodizing operation provides the aluminum conductors 8, 8' with a thin coating 12 of aluminum oxide of at least 100 Angstroms in thickness and preferably about 2000 Angstroms thick. The resistive element 6' is simultaneously provided with a thin coating 10 of tantalum oxide or oxynitride of at least 100 Angstroms in thickness and preferably about 3000 Angstroms thick. These anodized coatings, as noted, may be extremely thin while providing much more effective protective and insulating properties than obtained heretofore with other passivation coatings such as silicon carbide, for example. Prior art coatings had to be comparatively thick (6000 Angstroms, for example,) in order to function effectively at all as a passivation layer.

Finally, because the passivation structure is formed by chemically converting surface portions of the electrical conductors to an oxide or oxynitride thereof, the passivation structure is smooth and continuous, being free from defects such as pinholes and the like. Thus, the printhead of the invention is more uniform and reliable in operation and more consistently reproducible in manufacture.

There thus has been described an improved thermal ink jet printhead having a passivation structure which, though thinner than the passivation structures of the prior art, exhibits superior resistance to damage by chemical attack or collapse and/or cavitation of ink bubbles. The passivation structure of the invention, being formed from and integral with the underlying electrical elements, is not troubled by adherence problems to the underlying elements of the printhead which it protects.

What is claimed is:

1. A thermal ink jet printhead assembly comprising a printhead support member, an orifice plate having at least one orifice therein, means for supporting said orifice plate on said support member, heating means formed of a resistive material capable of being anodized insulatingly disposed between said orifice plate and said support member and adjacent said orifice, electrically conductive means capable of being anodized in contact with said heating means, and passivating means disposed on said heating means and said conductive means, said passivating means comprising respectfully different compounds of said resistive material and said conductive means being formed in situ from and integral with said heating means and said conductive means.

2. A thermal ink jet printhead assembly comprising a printhead support member, an orifice plate having at least one orifice therein, means for supporting said orifice plate on said support member, heating means formed of a resistive material capable of being anodized insulatingly disposed between said orifice plate and said support member and adjacent said orifice, electrically conductive means capable of being anodized in contact with said heating means, first passivating means on said heating means comprising an oxide of said resistive material formed therefrom, and second passivating means on said conductive means comprising an oxide formed therefrom.

3. A thermal ink jet printhead assembly according to claim 2 wherein said resistive material is selected from the group consisting of: tantalum, niobium, vanadium, hafnium, titanium, zirconium, yttrium and the nitrides thereof.

4. A thermal ink jet printhead assembly according to claims 2 or 3 wherein said conductive means is aluminum.

5. A thermal ink jet printhead assembly according to claim 3 wherein said first passivating means comprises an oxide of said named resistive materials.

6. A thermal ink jet printhead assembly according to claim 5 wherein said second passivating means is an oxide of aluminum.

7. A thermal ink jet printhead assembly comprising a printhead support member, an orifice plate having at least one orifice therein, means for supporting said orifice plate on said support member, heating means formed of tantalum or tantalum nitride insulatingly disposed between said orifice plate and said support member and adjacent said orifice, electrically conductive means formed of aluminum in contact with said heating means, and passivating means disposed on said heating means and said conductive means, said passivating means comprising respectfully different compounds of tantalum or tantalum nitride and aluminum being formed in situ from and integral with said heating means and said conductive means.

8. A thermal ink jet printhead assembly comprising a printhead support member, an orifice plate having at least one orifice therein, means for supporting said orifice plate on said support member, heating means formed of tantalum or tantalum nitride insulatingly disposed between said orifice plate and said support member and adjacent said orifice, electrically conductive means formed of aluminum in contact with said heating means, a first passivating means formed on and from said heating means, and a second passivating means formed on and from said conductive means.

9. A thermal ink jet printhead assembly according to claim 8 wherein said first passivating means is an oxide of tantalum.

10. A thermal ink jet printhead assembly according to claim 8 wherein said second passivating means is aluminum oxide.

11. A thermal ink jet printhead assembly according to claim 8 wherein said first passivating means is an oxide of tantalum and said second passivating means is aluminum oxide.

* * * * *